United States Patent [19]

Sidney et al.

[11] Patent Number: 5,206,118
[45] Date of Patent: Apr. 27, 1993

[54] ACID-SENSITIVE LEUCO DYE POLYMERIC FILMS

[75] Inventors: Lu Ann N. Sidney, Vadnais Heights; Doreen C. Lynch, Afton; Peggy S. Willett, Stillwater, all of Minn.

[73] Assignee: Minnesota-Mining & Manufacturing Company, Saint Paul, Minn.

[21] Appl. No.: 722,391

[22] Filed: Jun. 19, 1991

Related U.S. Application Data

[63] Continuation of Ser. No. 462,447, Jan. 18, 1990, abandoned, which is a continuation-in-part of Ser. No. 319,637, Mar. 6, 1989, abandoned.

[51] Int. Cl.$^5$ .......................... G03C 1/72; G03C 1/73
[52] U.S. Cl. ...................................... 430/343; 430/338; 430/344; 430/346; 250/482.1; 250/474.1; 356/234; 503/217; 503/218; 503/221
[58] Field of Search ............... 430/338, 344, 346, 343; 250/482.1, 475.2, 474.1; 503/221, 213, 216, 218, 217; 356/234

[56] References Cited

U.S. PATENT DOCUMENTS

| | | | |
|---|---|---|---|
| 2,936,276 | 5/1960 | Chalkley | 204/158 |
| 3,370,981 | 2/1968 | Ney, Jr. et al. | 117/230 |
| 3,495,266 | 2/1970 | Stillo | 346/1 |
| 3,609,093 | 9/1971 | Harrah | 252/300 |
| 3,710,109 | 1/1973 | Chalkley | 250/83 CD |
| 3,743,846 | 7/1973 | Matsumoto et al. | 250/474 |
| 3,899,677 | 8/1975 | Hori et al. | 250/474 |
| 4,130,760 | 12/1978 | Fanselow et al. | 250/474 |
| 4,173,677 | 11/1979 | Nakaho et al. | 428/336 |
| 4,308,459 | 12/1981 | Williams | 250/474 |
| 4,379,835 | 4/1983 | Lowrey et al. | 430/338 |
| 4,423,139 | 12/1983 | Isbrandt et al. | 430/338 |
| 4,507,226 | 3/1985 | Noakes et al. | 252/600 |
| 4,622,395 | 11/1986 | Bellus et al. | 544/37 |
| 4,826,626 | 5/1989 | Whittaker | 252/408 |

FOREIGN PATENT DOCUMENTS

| | | |
|---|---|---|
| 10779/61 | 10/1961 | Australia . |
| 60653/69 | 9/1969 | Australia . |
| 0255479 | 2/1988 | European Pat. Off. . |
| 1135755 | 2/1960 | Fed. Rep. of Germany . |
| 49-37811 | 10/1974 | Japan . |
| 61-61148 | 3/1986 | Japan . |
| 835120 | 10/1957 | United Kingdom . |
| 2182941A | 5/1987 | United Kingdom . |

OTHER PUBLICATIONS

Ciba-Geigy, "Dyestuff and Chemicalzs for Carbonless Copy Paper", Coating Conference (1983), San Francisco, pp. 157-165.

Humphreys et al., "Dosimetry and Quality Control in Electron Beam Processing," *IEEE Trans. on Nuclear Sci.*, vol. NS-26, No. 1, pp. 1784-1789 (1979).

Ohnishi et al., "On the Characteristics of Color Film Dosimeter" *Annual Report of the Radiation Center of Osaka Prefecture*, vol. 18, pp. 67-70 (1977).

Ueno, "Development of a Plastic Dosimeter for Industrial Use with High Doses," *Radiat. Phys. Chem.*, vol. 31, Nos. 4-6, pp. 467-472 (1988).

(List continued on next page.)

*Primary Examiner*—Charles L. Bowers, Jr.
*Assistant Examiner*—Thorl Chea

[57] ABSTRACT

A color-change dosimeter film made of a halogen-containing polymer in which is dispersed an acid-sensitive leuco dye, which dye a) is substantially free from groups that are sensitive to high-energy radiation and b) becomes colored in acid. This color-change dosimeter film (1) remains substantially colorless upon exposure to artificial illumination, including fluorescent light, for at least several months, (2) becomes colored upon exposure to high-energy radiation and accurately indicates small changes in dosage by the intensity of its color, and (3) remains substantially unchanged in its intensity of that color after being stored for several months, whether or not exposed to artificial illumination. An article of either quantitative or qualitative determination of the extent of high-energy radiation exposure is also provided, displaying a colored message of words, codes, symbols, or patterns on a substrate after exposure to the high-energy radiation.

14 Claims, 2 Drawing Sheets

OTHER PUBLICATIONS

Whittaker et al., "Some Parameters Affecting the Radiation Response and Post-irradiation Stability of Red 4034 Perspex Dosimeters," *Proceedings of the International Symposium of High-Dose Dosimetry*, pp. 293–305, International Atomic Energy Agency, Vienna (1985).

Zollinger, *Color Chemistry*, VCH Verlagsgsellschaft mbH, Weinheim, West Germany, pp. 301–303 (1987).

Ciba-Geigy, "Dyestuffs and Chemicals for Carbonless Copy Paper", Coating Conference (1983), San Francisco, pp. 157–165.

Pinner, et al., "The Coloration of Plastics by Irradiation–Part I", *Plastics* (Jun., 1957), pp. 194–195.

Pinner, et al., "The Coloration of Plastics by Irradiation–Part II", *Plastics* (Jul., 1957), pp. 268–270.

Garner, "Colour Formers", *Reports on the Progress of Applied Chemistry During 1973*, vol. 58, Academic Press (1975), pp. 148–152.

*Reports on the Progress of Applied Chemistry During 1975*, vol. 60, Blackwell Scientific Publications, (1977), p. 130.

Kassner, "Leuco Color Formers, Modern Imaging Materials", *Journal of Imaging Technology*, vol. 11, No. 5, Oct. 1985, pp. 224–228.

Humphreys et al., "Radiachromic: A Radiation Monitoring System", *Radiat. Phys. Chem.*, vol. 9, (1977), pp. 737–747.

Nikolaeva et al., "Pulse Radiolysis Study of Radiation Transformations of Methyl Yellow Polyvinylchloride Films", *Khim. Vys. Energ.*, 20, pp. 294–297 (1986) (translated).

Prusik et al., "Use of Polydiacetylenes in an Automated Label Dosimetry System", *Radiat. Phys. Chem.*, vol. 31, Nos. 4–6, pp. 441–447, 1988.

McLaughlin et al., "Radiochromic Dosimetry for Validation and Commissioning of Industrial Radiation Processes", *Radiat. Phys. Chem.*, vol. 31, Nos. 4–6, pp. 505–514, 1988.

Rahim et al., "Response of Radiation Monitoring Labels to Gamma Rays and Electrons", *Radiat. Phys. Chem.*, vol. 25, Nos. 4–6, pp. 767–775, 1985.

Inaki et al., "Photo-imaging System Containing Leuco Dyes and Haloganated Polymers", *Journal of Photopolymer Science and Technology*, vol. 2, No. 2, pp. 153–162, (1989).

Wang et al., "New Recording Material-Acid Sensitive Color Change Plates and Principle of Its Color Change Process", *Kexue Tongbao*, 1981, 26(22), pp. 1368–1371 (translated).

Siegel et al., "Visual Dosimetry Indicators", UV Process Supply, Inc.

Spencer et al., "A Simple Method of Dosimetry for E-Beam Radiation", *Radiat. Phys. Chem.*, vol. 25, Nos. 4–6, 1985.

"Standard Guide for Selection and Application of Dosimetry Systems for Radiation Processing of Food", *Annual Book of ASTM Standards*, Designation: E 1261-88 (1988).

Bishop et al. "Poly(halo)styrene Thin-Film Dosimeters for High Doese", *The Review of Scientific Instruments*, vol. 44, No. 4, pp. 443–452, 1973.

Barrett, "Dosimetry With Dyed and Undyed Acrylic", *Int. J. Appl. Radiat. Isot.*, vol. 33, pp. 1177–1187, 1982.

McKenna, "Industrial Coatings", Chapter 11 of *Plastisols and Organosols*, Sarvetnick, ed., Van Nostrand Reinhold Company, New York 1972.

Farrell et al., "Radiation-Sensitive Paint Verifies Product Irradiation", *Nucleonics*, Nov. 1963.

ACID-SENSITIVE LEUCO DYE POLYMERIC FILMS

This application is a continuation application of application Ser. No. 07/462,447 filed Jan. 18, 1990, now abandoned which is a continuation-in-part application of U.S. patent application Ser. No. 319,63 filed Mar. 6, 1989, now abandoned.

BACKGROUND OF THE INVENTION

1. Field of the Invention

The invention concerns an improved dosimeter of the type that indicates the degree of exposure to high-energy radiation by a change in its color and indicators which utilize the extent of that change in color. "High-energy" radiation includes UV, X-ray, E-beam, and gamma radiation.

2. Description of the Related Art

British Patent Specification No. 835,120 (Pinner et al.), which was published in 1960, teaches that polymers containing chlorine undergo color changes under "the action of high energy ionising radiation such as X-rays, alpha particles, gamma rays, and high energy electrons" (p. 1, ls. 21–28). "An adhesive tape of the sensitive material passed round an article will indicate whether all sides of it have been dosed equally. The indicator may also be used as a rough gauge to estimate the magnitude of a dose according to the degree of colour change observed" (p. 2, ls. 40–46).

Also in 1960, U.S. Pat. No. 2,936,276 (Chalkley) issued, stating:

"It has long been known that certain of the colorless para-amino derivatives of the triphenylacetonitriles, i.e., the dye cyanides, when combined with a suitable photoactivator, may be converted into colored compounds by irradiation with ultraviolet and shorter wave lengths, but show little or no sensitivity to visible light. Because of this property, these substances may be used in solution or absorbed or coated on a suitable base in the presence of an activator for recording and measuring radiation in the ultraviolet region" (col. 1, ls. 24–33).

In Example 1 of this Chalkley patent, the solution was exposed while being stirred. In Example 10, the solution was coated onto paper or glass plate, and allowed to gel to form a film that was exposed while still moist.

U.S. Pat. No. 3,710,109 (Chalkley) says at col. 2, lines 44–47: "The use of dye cyanide dosimeters in the form of a liquid solution has a number of advantages over the use of films and papers for dosimeters of high energy radiation". This patent then teaches that even better results are attained when the dye cyanide solutions have first been de-aerated and then used to measure radiation while protected from gaseous oxygen, e.g., in hermetically sealed ampules.

U.S. Pat. No. 4,507,226 (Noakes et al.) says that the problem with prior "devices and compounds for measuring ionizing radiation of less than 100 rads is that they either are not sensitive enough or they cost too much, or both" (col. 1, lines 11–14) and indicates that this is answered by a liquid in which a certain class of leucocyanide dye is dissolved. The solvent can be a monomer which is then polymerized into a self-sustaining plastic film. Comparable dosimeters made by dispersing leucocyanide dye into solutions of nylon polymers have been marketed for many years by Far West Technology Inc., Goleta, Calif. See Humpherys et al.: "Dosimetry and Quality Control in Electron Beam Processing," *IEEE Trans. on Nuclear Sci. Vol.* NS-26, No. 1, pp. 1784–1789 (1979).

Although the Far West dosimeters are sensitive and accurate, they (1) tend to become colored upon exposure to artificial illumination, especially fluorescent light, and hence must be kept in the dark before being used, (2) after being used, tend to become more intensely colored and later begin to fade unless stored in the dark, and (3) are adversely affected by exposure to high moisture, either before or after being irradiated. The Far West dosimeters are marketed with opaque envelopes together with instructions not to expose them to artificial light except certain yellow lamps.

Color-change dosimeters can also be made as taught in U.S. Pat. No. 3,743,846 (Matsumoto et al.), namely a film of a chlorine-containing polymer in which is dispersed one or more acid-sensitive coloring agents that change to different color or lose color when hydrogen chloride is released upon exposure to radiation of high intensity. Matsumoto says that the film can contain various additives including ordinary plasticizers such as dioctyl phthalate, dibutyl phthalate, and epoxidized soybean oil.

U.S. Pat. No. 3,899,677 (Hori et al.) repeats much of the teachings of the Matsumoto patent and lists as preferred coloring agents methyl yellow, aniline yellow, congo red, diethyl yellow, meta-methyl red and benzene azo diphenylamine. Hori also lists coloring agents that are useful because they lose color when irradiated.

UK Patent Application GB 2,182,941A (Whittaker), which was published 28 May 1987, also concerns color-change dosimeter film consisting of an acid-sensitive dye in a blend of halo-alkane and a polymer such as poly(methylmethacrylate).

Ohnishi et al.: "On the Characteristics of Color Film Dosimeter," Annual Report of the Radiation Center of Osaka Prefecture, Vol. 18, pp. 67–70, (1977) concerns color-change dosimeter films consisting of poly(vinyl chloride) containing dye and "available as Nitto Radocolor in commerce." It says that one of these, when subjected to gamma-ray irradiation, changed (dose in Mrads) from blue-green (0) to green (1) to yellow-green (2) to yellow (3) to orange (4) to red (5) to deep-red (7) to purple (10). FIG. 2 in Ohnishi shows the fading of irradiated film at 25° C. up to 40 hours that is said to be "very little or nothing" on film irradiated up to 4 Mrads and "weak" at 5 Mrads and above. FIGS. 5 and 6 in Ohnishi show that film that had been stored for eight years before irradiation showed truer color changes when stored in an "icebox" rather than at room temperature.

A dosimeter that may be similar to Nitto Radocolor has been announced by UV Process Supply, Inc., Chicago, Ill. Its "Con-trol-cure" UV/EB intensity labels, when exposed to UV, E-beam, or gamma rays, gradually change from green to magenta. The extent of the color change depends on the amount of energy they receive.

A similar type of dosimeter of the foregoing Ohnishi publication, the Matsumoto and Hori patents, the UV Process labels, and the Whittaker patent application is discussed in Ueno: "Development of a Plastic Dosimeter for Industrial Use with High Doses," *Radiat. Phys. Chem.*, Vol 31, Nos. 4–6, pp. 467–472 (1988) which reports a poster presentation at the 6th International Meeting on Radiation Processing, Ottawa, Canada, May 31–Jun. 15, 1987. The Ueno publication includes colored illustrations of a "Commercial Plastic Dosimeter" (FIG. 1) and of other dosimeters such as one whose color changes continuously in accordance with radiation dose (FIG. 5).

When we made dosimeters using the dyes of the Ueno publication, they did not show distinct color changes at low doses and did not retain the color to which they were changed even when stored in the dark. Furthermore, they were adversely affected by high moisture and high temperature after being used.

Another type of continuous color-change dosimeter is the ultraviolet dosimeter to measure sunburn as disclosed in U.S. Pat. No. 4,308,459 (Williams). A mixture of polyvinylchloride latex and multiple acid sensitive dyes is deposited on a paper substrate and dried to form a film. Exposure to ultraviolet light initiates progressive color changes which may be compared to standard colors to indicate extent of exposure.

Another type of color-change dosimeter is reported by Whittaker et al.: "Some Parameters Affecting the Radiation Response and Post-irradiation Stability of Red 4034 Perspex Dosimeters," *Proceedings of the International Symposium of High-Dose Dosimetry*, pages 293–305, International Atomic Energy Agency, Vienna (1985). Whittaker says that Red 4034 Perspex dosimeter is a radiation-sensitive dyed acrylic material and is packed in individual sealed sachets "to help maintain an optimized level of water-concentration gained in the dosimeters during production. In use, the dosimeters should only be removed from the sachets immediately prior to readout" (p. 294).

German Auslegeschrift No. 1,135,755 (Pfoertner), which published in 1962, concerns film that is sensitive to ionizing radiation such as X-ray, gamma, and electron-beam radiation but is insensitive to visible light if the ultraviolet is excluded. The film is made by dissolving a binding agent, a halogen compound, and a leuco crystal violet dye; coating the solution onto a glass or metal plate; and evaporating the solvent. To increase the pliability of the film, plasticizer can be included. The resulting self-supporting, colorless, transparent film can be removed from the plate and is indicated to be primarily useful as an X-ray film that can be produced in daylight while avoiding direct sunlight and does not require a separate developing step.

SUMMARY OF THE INVENTION

The invention provides an improved color-change dosimeter that (1) remains substantially colorless upon exposure to artificial illumination, including fluorescent light, for at least several months, (2) becomes colored quickly upon exposure to low levels of high-energy radiation and accurately indicates small changes in dosage by the intensity of its color, and (3) that intensity of color remains substantially unchanged after being stored for several months at room temperature, whether or not with exposure to artificial illumination. Furthermore, the novel color-change dosimeter is not deleteriously affected by exposure to high moisture, either before or after being irradiated. The dosimeter may be made in the form of a film coated on the surface of a substrate, e.g., an adhesive tape. The coated film may be in the form of a substantially colorless message becoming colored upon exposure to high-energy radiation.

The dosimeter film may provide either quantitative or qualitative information. The degree of the change of color of the dosimeter film quantifies the amount of high-energy radiation to which the dosimeter film has been exposed. The existence of a change in color beyond a predetermined amount qualifies the incidence of exposure of the dosimeter film to a predetermined amount of high-energy radiation.

There are industries where the quantitative information of a dosimeter film is useful to identify the extent to which a product has been exposed to a high-energy radiation source. There are other industries where the qualitative information of a dosimeter film indicator as compared to a predetermined color standard is useful to confirm whether or not a product has been exposed to a high-energy radiation source.

The dosimeter films of the present invention are versatile and useful to provide either quantitative or qualitative information, or both. Articles that quantitatively or qualitatively determine the extent of high-energy radiation exposure may be made using the dosimeter films of the present invention and a substrate.

Briefly, the color-change dosimeter of the present invention is a film of a halogen-containing polymer in which is dispersed acid-sensitive leuco dye, which dye a) is substantially free from groups that are sensitive to high-energy radiation and b) becomes colored in acid. "Acid-sensitive" means that when 0.1 g of the leuco dye is dissolved or dispersed in 25 ml of toluene and one drop of concentrated HCl is added, the solution or dispersion takes on the ultimate color of the dye within a few seconds after being shaken.

On the other hand, the acid-sensitive leuco dye should remain substantially colorless in a slightly acidic medium at ordinary room temperatures, because halogen-containing polymers, e.g. chlorine-containing polymers, tend to be inherently slightly acidic.

The amount of high-energy radiation which causes a substantially colorless dosimeter film of the present invention to become colored can range from as little as 0.1 kiloGrays (0.01 Mrads.) to as much as 1000 kiloGrays (100 Mrads.). Depending on the desired amount of high-energy radiation to be monitored, the dosimeter films of the present invention can be made to provide quantitative or qualitative information within a specific segment of that range of high-energy radiation dosages, e.g., from about 0.1 kGy to about 10 kGy for irradiation of food, or from about 10 kGy to about 200 kGy for sterilization of medical products.

A preferred method for making a color-change dosimeter film of the invention includes the following steps.

a) disperse acid-sensitive leuco dye into an organosol of a halogen-containing polymer, b) coat the resulting dispersion onto a substrate, and c) heat the coating to fuse the particles of the dispersion to form a continuous color-change dosimeter film.

The temperature and time of heating in step c) should be the minimum sufficient to fuse the particles, thus keeping the film as free from color as possible. For example, heating to 190°–210° C. for 30–60 seconds should be sufficient to produce a smooth, defect-free coating when producing the dosimeter film by a continuous process such as a continuous convection oven or by a "hot can" conduction roller.

A second useful method for making a color-change dosimeter film of the invention is as follows:

a) form a solution of acid-sensitive leuco dye and a halogen-containing polymer, b) coat the solution onto a substrate, and c) dry the coating to form a continuous color-change dosimeter film.

In step c) of the second method, it is preferred to employ sufficient heat to evolve the solvent as quickly as possible while keeping the temperature low enough not to cause the leuco dye to become substantially colored. The application of heat minimizes the time during which the dye and the halogen-containing polymer are in solution and hence minimizes the danger of premature coloring. In the second method, it is more difficult to obtain a smooth, defect-free film than in the first.

Thus, in either method, the acid-sensitive leuco dye is mixed into a liquid used to prepare the halogen-containing polymer, and the resulting mixture is coated on to the substrate for heating and further processing.

The coating step b) of either method may be in the form of printing, e.g., silk screen printing, of the liquid on to the surface of the substrate. Other well known methods of printing are also useful, e.g., rotogravure, offset, and the like. Alternatively, other coating methods such as knife coating, notched bar coating, roll coating, or wire wound rod coating may be used depending on the final effect desired.

A plasticizer preferably is present in step a) of either method in order to make it easier to produce a smooth, uniform film of good appearance. Furthermore, the presence of plasticizer enhances the physical properties of the film. The plasticizer preferably is employed in amounts of up to about equal parts by weight with the halogen-containing polymer In preferred color-change dosimeters of the invention, the acid-sensitive leuco dye is present in an amount of from 1 to 10 parts per 100 parts by weight of the halogen-containing polymer. When the novel color-change dosimeter film is to be used to indicate low dosages of high-energy radiation, there preferably are at least 3 parts of the acid-sensitive leuco dye per 100 parts by weight of the polymer. Substantially smaller amounts might not clearly indicate small differences in the low dosages of irradiation unless the novel color-change dosimeter film were quite thick. The necessary increase in thickness might both be uneconomical of raw materials and make the novel color-change dosimeter film more obtrusive than desirable.

For use in distinguishing between high dosages of high-energy radiation, the novel color-change dosimeter film may employ the acid-sensitive leuco dye in amounts less than one part per 100 parts by weight of the polymer.

At amounts substantially in excess of 10 parts acid-sensitive leuco dye per 100 parts by weight of the polymer, the novel color-change dosimeter film might become too intensely colored at low dosages of high-energy radiation to be able to indicate higher dosages, unless it were so thin as to be difficult to manufacture.

Preferably the novel color-change dosimeter film is from 0.01 to 0.1 mm in thickness. Films substantially thinner than 0.01 mm may be difficult to create with good uniformity, while films substantially thicker than 0.1 mm may be wasteful of material.

A color-change dosimeter film of the invention can be exposed to create a message in words, symbols, codes or other patterns to alert a user that a change in color intensity of unexposed portions of the dosimeter film is a cause for concern. Such a message can be created by exposure through a stencil, (e.g., used either in preparation of the film on a substrate or used to obscure unneeded portions of a film fully coated on a substrate), or by a directed E-beam, UV-laser beam, or other high-energy radiation beam. Other methods of application may be used also. Non-limiting examples are die or kiss cut processing, use of an application tape and a release liner in conjunction with weed and supply processing, and other printing and paper processing techniques known to those skilled in the art.

Preferably, the dosimeter film may be coated, (e.g. by printing using silk screening,) on a substrate to create a message. Such message may take the form of a striped pattern, as commonly used on steam or ethylene oxide sterilization indicator tapes, or as a word or series of words to indicate exposure of the substrate to such high-energy radiation.

Where words of one language are insufficient warning or notice to people using different languages, the film on the substrate may coated through silk screen printing in the form of a code, such as the Uniform Product Code (UPC) bar codes used with inventory control of goods, or a symbol such as the internationally recognized "radura" symbol used to indicate irradiation of food or the internationally recognized yellow and black "trefoil" radiation symbol to indicate exposure to or the presence of a certain predetermined level of high-energy radiation.

Alternatively, the color-change dosimeter film can be made by applying the acid-sensitive dye to the halogen-containing polymer. The acid-sensitive dye is used as an ink, applied by printing techniques, to create a substantially colorless message on the halogen-containing polymer. When the dosimeter film is thereafter exposed to high-energy radiation, the color-changed dye presents a written message in words, symbols, codes or other patterns for the same useful applications as that described in the paragraphs immediately above or other useful applications.

DETAILED DISCLOSURE

The acid-sensitive leuco dyes that are preferred for the color-change dosimeter film of the invention are described in "Dyestuffs and Chemicals for Carbonless Copy Paper" presented at Coating Conference (1983, San Francisco, Calif., pp. 157–165) by Dyestuffs & Chemicals Division, Ciba-Geigy Corp., Greensboro, N.C., the disclosure of which is incorporated herein by reference. Useful classes of leuco dyes described in that publication as color formers include chemical modifications of the following structural types:
carbazolyl methanes,
bisindophthalides, and
fluorans.

As indicated in the Ciba-Geigy publication, a major use for such color formers is in carbonless copy paper wherein microcapsules containing solutions of the color formers are coated onto the back side of the copy paper and, upon being broken under pressure, release the color former which becomes colored upon contacting an acidic clay on the front side of the underlying sheet of copy paper. See Zollinger: Color Chemistry, published by VCH Verlagsgesellschaft mbH, Weinheim, FRD, pp. 301-303 (1987).

A number of leuco dyes have been tested to determine whether they are "acid-sensitive" and thus useful in the present invention. Other classes of leuco dye as may become commercially available may also be useful in the present invention.

| Leuco Dye | Trade Name | Type |
|---|---|---|
| A | "Pergascript" Blue S-RB* | carbazolyl blue |
| B | "Pergascript" Red I-6B | bisindolylphthalide |
| C | "Pergascript" Black N-102 | the fluoran shown in FIG. 16 of above-cited Ciba-Geigy publ. |
| D | "Pergascript" Turquoise | benzoyl leuco oxazine |
| E | "Pergascript" Green I-2G | |
| F | "Pergascript" Blue I-2G | |
| G | "Copychem" XI** | |
| H | Leuco crystal violet | |
| I | Leuco malachite green | |
| J | Benzoyl leuco methylene blue | benzoyl leuco thiazine |
| K | Crystal violet lactone | |

*"Pergascript" is a trade name of Ciba-Geigy
**"Copychem" is a trade name of Hilton Davis Table I reports the "Initial Color" and "Acidified Color" of the solution or dispersion and the "Elapsed Time" to achieve the acidified color after adding one drop of HCl and shaking.

TABLE I

| Leuco Dye | Initial Color | Acidified Color | Elapsed Time |
|---|---|---|---|
| A | light yellow | royal blue | instantaneous |
| B | very light green | red fuchsia | instantaneous |
| C | colorless | green-black | instantaneous |
| D | bright light green | turquoise blue | 0.5 hour |
| E | colorless | dark green | instantaneous |
| F | colorless | navy blue | instantaneous |
| G | very light turbid white | red | instantaneous |
| H | very light brown | royal blue | 8 hours |
| I | light brown | dark green | >8 hours |
| J | very light green | blue-green | 0.5 hour |
| K | very light brown | dark green | >8 hours |

Of the eleven leuco dyes tested as reported in Table I, each of the six that achieved the acidified color instantaneously is "acid-sensitive" as defined above, and each that achieved the acidified color instantaneously had uniform color throughout after being shaken. Upon testing each of the other five, a precipitate was formed.

When leuco dyes that are not acid-sensitive, e.g., leuco dye H, have been used to make color-change dosimeters by the preferred method outlined above, it has sometimes been impossible to fuse the particles of the dispersion in step c) without converting the leuco dye to its ultimate color.

Alternatively, when premature color change is avoided, such as by using leuco dyes D or J, any unexposed leuco dye that is not acid-sensitive has not remained substantially colorless in artificial light. Then, after being exposed to high-energy radiation to less than a reading of full intensity, any leuco dye that is not acid-sensitive will gradually change to full intensity even when stored in the dark.

The halogen-containing polymer may be a chlorine-containing polymer, a fluorine-containing polymer, or a bromine-containing polymer. Of the types of halogen-containing polymers, chlorine-containing polymers are preferred due to availability and cost.

A preferred chlorine-containing polymer for use in the novel color-change dosimeter film is poly(vinyl chloride) [PVC], it being inexpensive, durable, and exceedingly tough when plasticized. Other useful chlorine-containing polymers include poly(vinylidene chloride), copolymers of vinyl chloride and vinylidene chloride, copolymers of vinyl chloride and vinyl acetate, and chlorinated polyethylene, or mixtures thereof.

Useful fluorine-containing polymers include such as vinylidene fluoride-hexafluoropropylene copolymer, vinylidene fluoride-chlorotrifluoroethylene copolymer, vinylidene fluoride-propylene-tetrafluoroethylene terpolymer, poly(vinylidene fluoride), propylene-tetrafluoroethylene copolymer, poly(tetrafluoroethylene), poly(vinyl fluoride), poly(hexafluoropropylene), poly(chlorotrifluoroethylene), ethylene-tetrafluoroethylene copolymer, vinylidene fluoride-perfluoro(methyl vinylether)-tetrafluoroethylene terpolymer, and poly(trifluoropropyl methyl) siloxane. Desirably, the fluorine-containing polymer is a polymer comprising vinylidene fluoride and at least one fully fluoro-substituted polyolefin having less than four carbon atoms. A commercially available fluoroelastomer is poly(vinylidene fluoride-co-hexafluoropropylene) sold under the brand name "Fluorel" by 3M Company of St. Paul, Minn.

Useful bromine-containing polymers include brominated polyester epoxy resins, poly(dibromophenylene oxide), poly(2,4,6-tribromostyrene), the polycondensation product of dimethyl terephthalate, 1,3-bis(2'-hydroxyethyl)-4,5,6,7-tetrabromobenzimidazolone and 1,4-butandiol, and the polycondensation product of tetrabromobisphenol A, isophthalic acid and terephthalic acid.

Preferred plasticizers include phthalates such as dioctyl phthalate, phosphates such as tributyl phosphate, trimellitates such as tri-2-ethylhexyl trimellitates, and polymerics, especially a medium weight polyester such as "Admex" 770 from Nuodex, Inc..

A heat-stabilizer may be used to prepare the dosimeter films of the present invention. The heat-stabilizer is present in the dispersion of the organosol of one method or in the solution prepared according to the other method. The heat-stabilizer may help to minimize coloring of the acid-sensitive leuco dye during manufacture of the novel color-change dosimeter. On the other hand, the presence of a heat-stabilizer tends to move the color-changing range of the novel dosimeters to higher dosages.

Heat-stabilizers useful in the present invention include Ca/Zn compounds and Ba/Zn compounds commercially available from Witco Corporation under the brand name "Mark", (e.g., "Mark V-1923" Ca/Zn compound) and commercially available from the Bedford Chemical Division of Ferro Corporation under the brand name "Therm-chek TM", (e.g., "Therm-chek TM BH-185" Ba/Zn compound); Ca/Zn carboxylate compounds commercially available from AKZO Chemie by under the brand name "Interstab TM"; "Irgastab T-634" maleic acid-free organotin carboxylate compound commercially available from Ciba-Geigy Corporation; "Irgastab TM T-266" octyltin mercaptide compound commercially available from Ciba-Geigy Corporation; "Stanclere T-200M" sulfur ester tin compound commmercially available from AKZO Chemie by; "Stanclere T-55" butyltin carboxylate compound commercially available from AKZO Chemie by; "Mark 1965" alkyl mercaptide compound commercially available from Witco Corporation; and "Mark 275" tinmaleate compound commercially available from Witco Corporation.

Preferably when a heat-stabilizer is used, it is present only in very small amounts, preferably the smallest amount possible depending on the reaction conditions. For example, in batch processing conditions, up to 1.0 part per 100 parts by weight of the halogen-containing polymer is sufficient. For continuous processing conditions, up to 10 parts per 100 parts by weight of the halogen-containing polymer, and preferably 7 parts, is sufficient. Excess amounts might detract from the ability of the dosimeter to distinguish between low dosages.

As described above, the dosimeter film of the present invention may be made to provide quantitative or qualitative information after exposure to high-energy radiation in a wide range of dosages. Wire and cable coating processing may occur with exposure to high-energy radiation at the higher end of the useful range, about 1000 kiloGrays (100 Mrads.) Another technique for moving the color-changing range of the novel dosimeter to higher ranges is to incorporate an organic or inorganic base, e.g., triethylamine or magnesium oxide. Use of the latter may be helpful to establish a threshold of exposure to high-energy radiation before the dosimeter begins to indicate the presence of a predetermined amount of high-energy radiation.

When it is desired to make the novel dosimeter more sensitive to low dosages of high-energy radiation, e.g., from 0.1 to 10 kGy (0.01–1 Mrads.) for use in monitoring the irradiation of food, a more highly halogenated polymer may be employed. This also can be accomplished by incorporating a nonpolymeric halogenated material into step a) of the above-outlined methods, e.g., chloroform or bromoform.

A preferred substrate for step b) of either method is a tough, flexible, preformed film of a polymer which preferably is identical to the halogen-containing polymer employed in step a) in order to assure good adhesion. Such a substrate permits the novel color-change dosimeter film to be quite thin, e.g., 0.01 to 0.03 mm in thickness.

Another useful substrate has a release surface from which the film formed in step c) may be removed. This requires the film to be thick enough (typically 0.03 mm or more) and to have sufficient strength and integrity to permit it to be handled after removing it from the release film.

Other substrates useful for application of the dosimeter film thereto may be any substrate that does not have such amounts of acid therein as to cause a reaction with the acid-sensitive leuco dye and which does not degrade in the presence of either the heating or drying temperatures used to prepare the film or the high-energy radiation dosages during use. Non-limiting examples of substrates include adhesive-coated paper, masking tape, adhesive-backed fabric, adhesive-backed non-woven material, and adhesive backed porous membranes. Desirable substrates include polymer films, e.g., polyolefinic films, of various thickness ranging from about 0.03 mm to about 1 mm. A preferred substrate is a polyester film having a thickness of about 0.08 mm.

The film produced by either method is useful as a color-change dosimeter, either by itself or adhered to a small chip. The dosimeter film can be coated with an adhesive to facilitate its application to an article, e.g., either a package containing goods or the goods themselves, that requires monitoring. Alternately, the side of a substrate, opposite the side on which a dosimeter film is applied, can be coated with adhesive for applying to goods or their packaging.

A variety of types of adhesives are commercially available in the form of double release coated transfer tapes from 3M Company of St. Paul, Minn., among other vendors. The method of coating such adhesives to a thin material by coating the adhesive or using a transfer tape to apply the adhesive are known in the art and could be used to coat such adhesive to the dosimeter film or the substrate on which the dosimeter film is secured.

If the dosimeter film is coated directly with adhesive, care should be taken to select an adhesive which does not cause the acid-sensitive leuco dye in the film to react and change color. For example, a pressure sensitive adhesive having its acidity neutralized by a base would be useful. Otherwise, if the side of the substrate, opposite the side to which the dosimeter film is applied, is coated with adhesive, the adhesive may contain carboxyl functional groups without affecting the leuco dye in the dosimeter film.

Non-limiting examples of adhesives include hot melt adhesives and pressure sensitive adhesives, which types and methods of usage are generally described in Handbook of Pressure Sensitive Adhesive Technology, 2nd Ed., D. Satas, Ed. (Van Nostrand & Company, N.Y. 1989), the disclosure of which is incorporated by reference. Of these adhesives, acrylate based copolymers are desirable. These copolymers are formed from the polymerization of (a) at least one monomer comprising an acrylate or methacrylate ester of a non-tertiary alcohol or a mixture of non-tertiary alcohols, with the alcohols having from 1 to 14 carbon atoms and (b) at least one ethylenically unsaturated monomer comprising acrylic acid, methacrylic acid, itaconic acid, acrylamide, methacrylamide, acrylonitrile, vinyl acetate, N-vinyl pyrrolidone, or combinations thereof, polymerizing in a weight percentage ratio of ester to ethylenically unsaturated monomer of from about 85:15 to about 97:3 and yielding a copolymer having an inherent viscosity of about 1 to about 2 dl/g. Additionally, such copolymers may have tackifiers incorporated therein in amounts as much as 50 weight percent of the copolymer. A commercially available tackifier is "Foral" 85 tackifier from Hercules Co. of Wilmington, Del.

The adhesive preferably is pressure-sensitive. Of the acrylate copolymers described above, most are pressure sensitive and prepared generally according to U.S. Pat. No. 2,884,126/RE24,906, the disclosure of which is incorporated by reference herein. When a pressure sensitive adhesive is used with a dosimeter film or its substrate, the adhesive should be protected by a removable liner such as a sheet of paper that has a low-adhesion surface against the adhesive layer. The method of application of the adhesive includes coating the adhesive using the same type of coating techiques as described above with respect to the coating step b) of either method used to prepare the dosimeter film. Alternatively, with the presence of a removable liner desired for a pressure sensitive adhesive, the adhesive may be applied using a double coated transfer tape, such as #950 5 mil Adhesive Transfer Tape commercially available from the Industrial Specialties Division of 3M Company, St. Paul, Minn.

The dosimeter film preferably is provided with a nearly transparent protective overcoating such as a clear aliphatic polyurethane coating when the dosimeter is to be used to measure E-beam or gamma radiation. Such a protective coating provides better abrasion resistance and also better ensures both against triggering of the leuco dye by ambient light and against changes in intensity after irradiation. However, when the novel dosimeter is to be used to indicate dosages of ultraviolet radiation, such an overcoating might inhibit the measurements.

Usefulness of the Invention

Because of its above-enumerated advantages, the color-change dosimeter film of the invention can be put to uses for which prior color-change dosimeters were either not useful or only marginally useful. For example, when incorporated into a package that is to be attached to an item to be sterilized with high-energy radiation, e.g., food or medical/surgical supplies, it continues to provide a visually verifiable record of the extent of the sterilizing dosage for prolonged periods of time, subject to quantitative correlation to a look-up table, stored information or data in software, or other correlation methods based on the intensity of the color change or a qualitative comparison to a color standard proximal to the dosimeter film.

Because the acid-sensitive leuco dyes of unexposed color-change dosimeters of the invention remain substantially colorless under artificial illumination, especially when used with a protective overcoating, they will not erroneously suggest that an unsterilized package had been sterilized, even though some prior color-change dosimeters could because of their instability under artificial illumination.

In the continuous production of sheet goods involving exposure to E-beam radiation (e.g., magnetic recording tape) or UV radiation (e.g., adhesive coatings), a continuous strip of the novel dosimeter may be passed through the irradiation area along with the sheet goods and then monitored (either visually or with a spectrophotometer), thus verifying that the required radiation has been applied.

Color-change dosimeter films of the invention have been demonstrated to provide accurate measuring of dosages of various types of high-energy radiation. Inasmuch as we are not aware of any reports of a color-change dosimeter being useful for measuring UV-laser irradiation, the novel color-change dosimeter film may be the first to have that utility.

The number of uses of dosimeter films of the present invention can be expressed in a variety of ways. Depending on whether the dosimeter film is to indicate the exposure of a predetermined amount of high-energy radiation or the amount of the exposure, the dosimeter film may be either an indicator of qualitative determination or a dosimeter of quantitative determination.

The dosimeter films can be useful in either a qualitative or quantitative mode of operation in the medical, food processing, industrial processing, environmental, or nuclear industries, among others, whether private, public or military in nature. The dosimeter films of the present invention have usefulness which span at least the disciplines of chemistry, biology, and physics.

As a qualitative indicator, the dosimeter may be compared to a color standard corresponding to a predetermined level of color change due to exposure of the dosimeter film to a certain amount of high-energy radiation. As a quantitative dosimeter, the dosimeter film may be calibrated to known spectrophotometrically measured changes in color and the extent of exposure of the dosimeter to high-energy radiation.

In the medical industry, non-limiting examples of uses of the dosimeter films of the present invention are sterilization indicator tapes for gamma or E-beam sterilization of medical products and/or their packaging, diagnosis and treatment programs in radiography and cancer therapy, sterilization of pharmaceuticals and cosmetics, or light indicator indicator films or tapes used in treatment of neonatal infants or other patients exposed to uv radiation for treatment of jaundice and other uv responsive illnesses. To that extent, the dosimeter films of the present invention may serve as radiation monitors for those uses as disclosed in U.S. Pat. No. 4,130,760 (Fanselow et al.).

In the food processing industries, non-limiting examples of uses of dosimeter films of the present invention are irradiation indicator tapes having messages, such as the radura symbol (c.f., 21 C.F.R. Section 179.30) or the UPC bar code, indicating the irradiation of fresh and preserved foods, spices, and the like, and uv radiation indicator tapes for consumer packages indicating freshness of foods such as milk.

In the industrial processing and environmental industries, non-limiting examples of uses of dosimeter films of the present invention are indicator tapes, chips, or other forms used to indicate levels of such radiation processes as crosslinking of polymers, scissoning of polymers, grafting of polymers, electronic circuitry testing and monitoring equipment, imaging monitoring and imaging analysis, waste treatment processing and sterilization, pollution abatement and effluent gas monitoring, and other activities.

In the nuclear industries, non-limiting examples of uses of dosimeter films of the present invention are "hot-spot" indicator tapes for use in nuclear power plants or other facilities where radioactive materials are present, sealing tape for use in packaging and otherwise containing nuclear materials or nuclear waste during storage or transport, and in accident reconstruction and equipment monitoring. The use of messages, such as a symbol in the same form as the yellow and magenta "trefoil" radiation symbol (c.f., 29 C.F.R. Section 1910.96), is most preferable to positively indicate the presence of levels of high-energy radiation materials near or above approved amounts.

In the natural science disciplines, non-limiting examples of dosimeter films of the present invention include analysis, kinetic studies, synthesis monitoring, and testing of chemical reactions involving high-energy radiation, mutation breeding and other radio biology studies involving high-energy radiation, and lasers and holography and other physics studies involving high-energy radiation.

The dosimeter films of the present invention are useful in such a variety of industries because their tolerance of exposure to artificial illumination before or after exposure to the high-energy radiation and their tolerance of exposure to moisture allows placement of the film on goods (product or packaging) by one party in the stream of commerce for detection of high-energy radiation exposure by another party in the stream of commerce. No longer are uses for dosimeters limited by their handling requirements. Thus, a variety of other uses for the dosimeter films of the present invention, which may develop in the expansion of present industries or the development of future industries because of the removal of complicated handling requirements, may be possible within the scope of the present invention.

The novel dosimeter has a variety of uses in addition to those described above. For example, it may be worn in plain sight by someone who might be exposed to high-energy radiation, thus providing an immediate visual indication as to whether such exposure has reached dangerous levels.

THE DRAWING

The invention may be more easily understood in reference to the drawing, of which:

Figure 1:
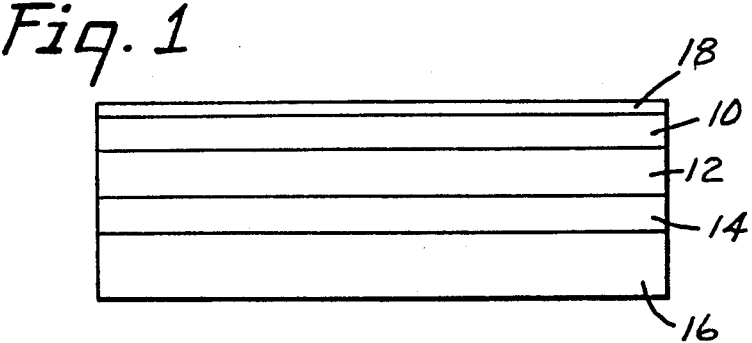
FIG. 1 is a schematic edge view of a color-change dosimeter film of the invention, greatly magnified.

The color-change dosimeter film 10 shown in FIG. 1 is supported by a tough, flexible polymeric sheet 12, on the opposite face of which is a pressure-sensitive adhesive layer 14. Protecting the adhesive layer 14 is a removable liner 16. Protecting the dosimeter film is an abrasion-resistant polymeric clear coat 18.

Figure 2:
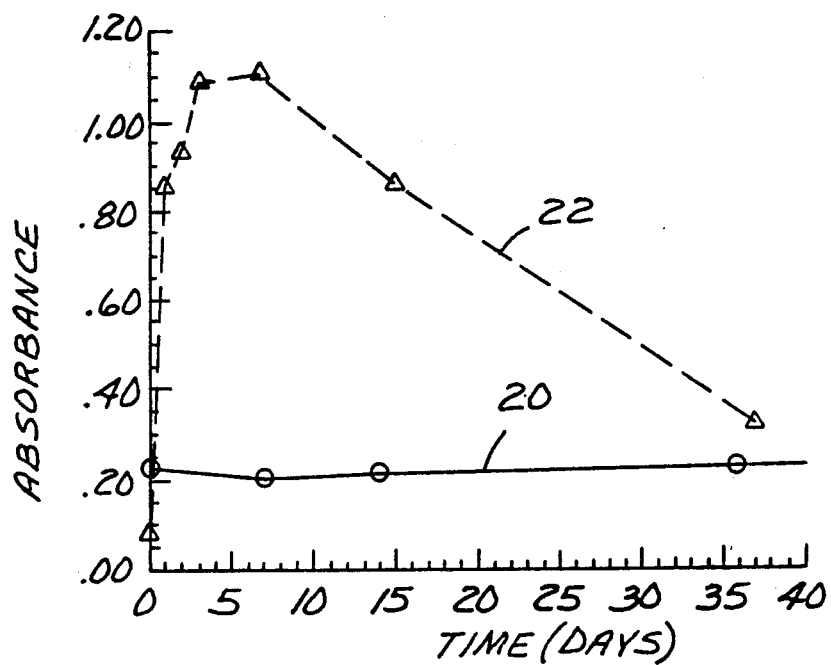
FIG. 2 is a graph comparing the effects of exposure to artificial illumination of unexposed samples of the color-change dosimeter film of Example 1 and a color-change dosimeter of the prior art.

In FIG. 2, curve 20 shows the absorbance of the unirradiated color-change dosimeter film of Example 1 after exposure to fluorescent illumination for the indicated number of days. Curve 22 shows comparative readings for an above-discussed Far West dosimeter. Raw data for FIG. 2 is included in Table VII below.

Figure 3:
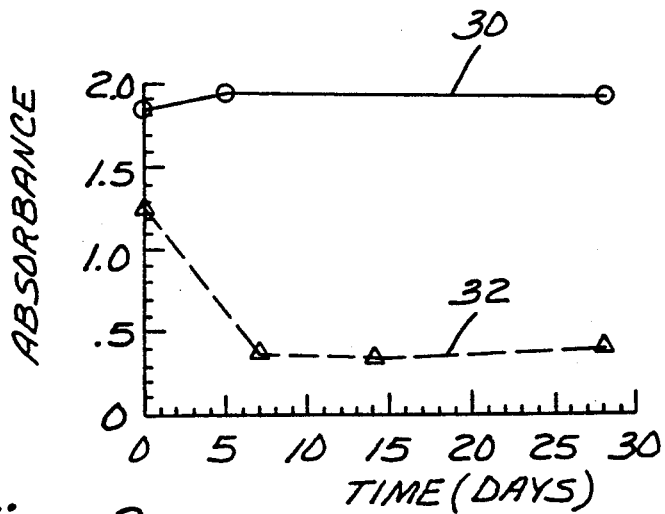
FIG. 3 is a graph comparing the changes in intensity of exposure upon aging of the color-change dosimeter film of Example 1 and a different color-change dosimeter of the prior art.

In FIG. 3, curve 30 shows the absorbance of the color-change dosimeter film of Example 1 after it has been subjected to E-beam radiation, both initially and after storage in the dark for the indicated number of days. Curve 32 shows the absorbance under comparable conditions of a prior dosimeter film made using methyl yellow dye. Raw data for FIG. 3 is shown in Table V below.

Figure 4:
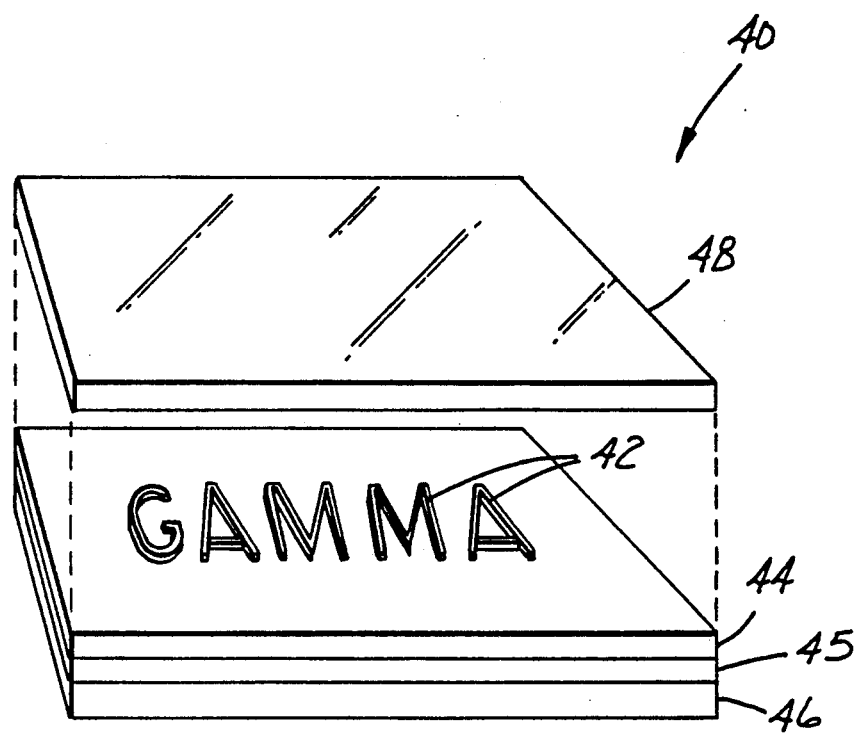
FIG. 4 is a partially exploded, perspective view of a color-change dosimeter printed as a transparent message on an adhesive coated substrate, greatly magnified.

In FIG. 4, a segment of a dosimeter indicator tape 40 is shown. The dosimeter film in FIG. 4 is in the form of slightly raised letters 42 substantially colorless until exposed to high-energy radiation. The film in the form of letters 42 is formed by silk screen printing of a dispersion of an organosol containing the halogen-containing polymer and the leuco dye onto a substrate comprising a tough, flexible polymeric sheet 44 and then heating the assembly to form the film message 42 on the surface of sheet 44. The sheet 44 has a coating of pressure-sensitive adhesive 45 applied to its other surface. The adhesive layer 45 is protected by a removable liner 46. Protecting the dosimeter film message 42 is an abrasion-resistant polymeric clear coat 48.

For a greater appreciation of the embodiments of the invention, non-limiting examples are provided.

EXAMPLE 1

366.4 of "Admex" 770 medium molecular weight polyester plasticizer from Nuodex, Inc., 230.6 g of xylene, 163.2 g of diisobutylketone, and 86.4 g mineral spirits were combined using a "Cowles" propeller mixer. While increasing the speed of the mixer, 1048.2 g of "Geon" 178 dispersion grade PVC from B.F. Goodrich Co. were added. After the addition was complete, the dispersion was mixed 3 minutes. 800 g of sand were added, followed by milling in a sandmill for about 10–12 minutes. The dispersion was filtered to provide an organosol.

To 20 g of the organosol was added a 25% solution of Leuco Dye A in toluene in an amount providing 10 parts per 100 parts PVC. This was knife-coated (0.025 mm thickness) onto a preformed sheet of plasticized PVC 0.05 mm in thickness. After drying the coating in air, it was heated in an air-circulatng oven at 204° C. for 60 seconds to fuse the organosol into a film 0.018 mm in thickness, thus providing a color-change dosimeter film of the invention that was substantially colorless, but had a faint blue coloring.

Over the exposed surface of the color-change dosimeter film was applied a protective 2-part polyurethane clear coat having a thickness on the order of 0.01 mm. The polyol part of the clear coat was "K-Flex" 188 from King Industries, and the isocyanate part was "Desmodur" N3200 from Mobay Chemical Corp., formulated at an isocyanate to hydroxyl ratio of 1 and cured in an air-circulating oven at 75° C. for 1½ hours.

Unirradiated samples of the protectively coated color-change dosimeter film of Example 1 were E-beam irradiated with a Energy Sciences Inc. Model CB-150 Electron Beam Processor at 175 KeV, 20 feet/min. (6.1 m/min.), at 80 ppm oxygen to receive differing dosages, expressed in both Megarads (Mrads) and kiloGrays (kGys). Absorbance values at 615 nm were recorded with an IBM Instruments Model 9430 UV-visible spectrophotometer and monitored, both immediately after irradiation and then after storage in the dark at about 20° C. for 5 days and again after 28 days. Results (averages of 2 samples) are recorded in Table II. An identical set of samples was placed face up on a bench of a laboratory that was illuminated with fluorescent lamps, with results reported in Table III. A third set was placed in a dark humidity-controlled oven at 38° C. and 100% RH (non-condensing), with results reported in Table IV.

TABLE II

| E-beam Dosage (Mrads, kGys/10) | Absorbance after storage in dark | | |
|---|---|---|---|
| | 0 days | 5 days | 28 days |
| 0 | 0.25 | 0.25 | 0.20 |
| 1 | 0.45 | 0.43 | 0.36 |
| 2.5 | 0.65 | 0.65 | 0.62 |
| 5 | 1.10 | 1.12 | 1.10 |
| 8 | 1.62 | 1.68 | 1.61 |
| 10 | 1.82 | 1.93 | 1.90 |

TABLE III

| E-beam Dosage (Mrads, kGys/10) | Absorbance after storage in light | | | |
|---|---|---|---|---|
| | 0 days | 4 days | 12 days | 34 days |
| 0 | 0.22 | 0.23 | 0.23 | 0.22 |
| 1 | 0.37 | 0.34 | 0.32 | 0.29 |
| 2.5 | 0.65 | 0.64 | 0.54 | 0.44 |
| 5 | 1.12 | 1.09 | 1.02 | 0.82 |
| 8 | 1.64 | 1.64 | 1.57 | 1.44 |
| 10 | 1.87 | 1.79 | 1.84 | 1.71 |

TABLE IV

| E-beam Dosage (Mrads, kGys/10) | Absorbance after 38° C./100% RH | | | |
|---|---|---|---|---|
| | 0 days | 6 days | 14 days | 36 days |
| 0 | 0.23 | 0.22 | 0.22 | 0.29 |
| 1 | 0.43 | 0.33 | 0.36 | 0.41 |
| 2.5 | 0.63 | 0.58 | 0.53 | 0.59 |
| 5 | 1.07 | 1.16 | 1.17 | 1.16 |
| 8 | 1.56 | 1.82 | 1.85 | 1.88 |
| 10 | 1.76 | 2.00 | 2.14 | 2.15 |

Samples of the protectively coated color-change dosimeter film of Example 1 were E-beam irradiated in the same way to receive a dosage of 10 Mrads. Using the UV-visible spectrophotometer, readings made initially and after storage in the dark as reported in Table V. Also tested for comparison was a color-change dosimeter made using methyl yellow dye of the Ueno publication cited above under "Description of the Related Art". The data of Table V is used in FIG. 3 of the drawing.

TABLE V

| | Absorbance after storage in dark | | | | |
|---|---|---|---|---|---|
| | 0 days | 5 days | 7 days | 14 days | 28 days |
| Example 1 (at 615 nm) | 1.82 | 1.93 | | | 1.90 |
| Methyl yellow (at 555 nm) | 1.26 | | 0.34 | 0.33 | 0.35 |

EXAMPLES 2-7

Substantially colorless color-change dosimeter films were made in the same way as in Example 1 except that instead of Leuco Dye A, each employed another leuco dye as indicated in Table VI. Each of the resulting dosimeters was substantially colorless, but was faintly colored as indicated in Table II which also indicates the ultimate color to which each changed after being E-beam irradiated with a Energy Sciences Inc. Model CB-150 Electron Beam Processor at 175 KeV, 20 feet/min. (6.1 m/min), at 80 ppm oxygen to receive a dosage of 10 Mrads or 100 kiloGrays.

TABLE VI

| Example | Leuco Dye | Initial Faint Coloring | Ultimate Dup. Coloring |
|---|---|---|---|
| 1 | A | blue | royal blue |
| 2 | B | red | red fuchsia |
| 3 | C | black | green-black |
| 4 | D | turquoise | teal blue |
| 5 | E | green | dark green |
| 6 | F | blue | blue-violet |
| 7 | G | yellow | deep yellow |

Unirradiated samples of the protectively covered color-change dosimeter films of each of Examples 1-3 were laid flat beneath two fluorescent lamps (GE "F 40 CW") at ordinary room temperature. After lying for 57 days on a bench of a laboratory that was illuminated by overhead fluorescent lamps, each of the samples remained substantially colorless. At this time, the samples of Examples 2 and 3 were withdrawn but that of Example 1 was still substantially colorless after more than 7 months.

For comparison, two samples of Far West "FWT-60-00" dosimeters were tested in the same way at generally the same time except starting on different days, and testing of the Far West dosimeter was discontinued after 37 days. Spectrophotometer readings (average of two samples) on an IBM Instruments Model 9430 spectrophotometer are reported in Table VII at λ max, i.e., at 615 nm for Example 1, 540 nm for Example 2, and 600 nm for Example 3 and Far West. Some of the data of Table VII is in graph form in FIG. 2 of the drawing.

TABLE VII(a)

| | (unirradiated specimens) | | | | | |
|---|---|---|---|---|---|---|
| | Absorbance after storage in light (days) | | | | | |
| Sample | 0 | 1 | 6 | 7 | 12 | 14 |
| Ex. 1 | 0.23 | | 0.20 | | | 0.22 |
| Ex. 2 | 0.26 | | | | 0.23 | |
| Ex. 3 | 0.25 | | | | 0.28 | |
| Far West | 0.08 | 0.85 | | 1.11 | | |

TABLE VII(b)

| | (unirradiated specimens) | | | | | |
|---|---|---|---|---|---|---|
| | Absorbance after storage in light (days) | | | | | |
| Sample | 15 | 26 | 36 | 37 | 57 | 226 |
| Ex. 1 | | | 0.23 | | | 0.25 |
| Ex. 2 | | 0.22 | | | 0.23 | |
| Ex. 3 | | 0.27 | | | 0.29 | |
| Far West | 0.86 | | | 0.32 | | |

Other samples of the protectively covered color-change dosimeter film of Example 1 were gamma irradiated using a Cobalt 60 gamma sterilizer made by Atomic Energy of Canada Ltd. (Model JS-7500). Spectrophotometer readings using an IBM Instruments Model 9430 spectrophotometer (averages of 2 samples) were made two days after the samples were received after being sent for gamma irradiation. The samples were stored in the dark. The results are recorded in Table VIII.

TABLE VIII

| Gamma Dosage (Mrads, kGys/10) | Absorbance at 615 nm after storage in days after receipt of samples | | |
|---|---|---|---|
| | 2 days | 4 days | 27 days |
| 0 | 0.29 | 0.23 | 0.22 |
| 1 | 0.95 | 0.90 | 0.90 |
| 2 | 1.46 | 1.36 | 1.37 |
| 3 | 1.69 | 1.71 | 1.66 |
| 5 | 3.30 | 2.75 | 3.06 |
| 8 | 5.76 | 5.77 | 5.77 |

Samples of the protected dosimeter films of Examples 1, 2 and 3 were covered by a plastic stencil 2 mm in thickness cut out to have mathematical symbols. Each then was E-beam irradiated at a dosage of 10 Mrads or 100 kGys, leaving a sharp, densely color negative image of the stencil. After being stored in the dark for about six months, each retained its original sharp image.

EXAMPLE 1-A

A color-change dosimeter film was made as in Example 1 except that instead of coating the dispersion onto PVC, it was coated onto a preformed sheet of poly(ethyleneterephthalate) [PET] 0.075 mm in thickness. The resulting color-change dosimeter film was protectively covered with clear polyurethane as in Example 1. Specimens of this color-change dosimeter film were E-beam irradiated with a Energy Sciences Inc. CB-150 Electron Beam Processor and tested for absorbance values using the IBM Instruments 9430 spectrophotometer as described above, both immediately and after storage in the dark. Results are in Table IX.

TABLE IX

| E-beam Dosage (Mrads, kGys/10) | Absorbance at 615 nm after storage in dark | | | |
|---|---|---|---|---|
| | 0 days | 1 day | 5 days | 69 days |
| 0 | 0.23 | 0.23 | 0.24 | 0.18 |
| 1 | 0.36 | 0.37 | 0.36 | 0.27 |

TABLE IX-continued

| E-beam Dosage (Mrads, kGys/10) | Absorbance at 615 nm after storage in dark | | | |
|---|---|---|---|---|
| | 0 days | 1 day | 5 days | 69 days |
| 2.5 | 0.65 | 0.66 | 0.64 | 0.46 |
| 5 | 0.75 | 0.76 | 0.74 | 0.54 |
| 8 | 0.93 | 0.95 | 0.94 | 0.71 |
| 10 | 1.43 | 1.46 | 1.45 | 1.11 |

EXAMPLES 1-B

A color-change dosimeter film was made as in Example 1 except that the polyurethane protective overcoating was omitted. Samples were irradiated with a Questek Model 2440 ultraviolet excimer laser at 193 nm and 16 mJ/cm$^2$ at various numbers of pulses. Absorbance values were recorded with the IBM Instruments 9430 UV-visible spectrophotometer and monitored, both immediately after irradiation and then after storage in the dark at about 20° C. Results (averages of 2 samples) are recorded in Table X.

TABLE X

| No. of Pulses | Absorbance at 615 nm after storage in dark | | | |
|---|---|---|---|---|
| | 0 days | 1 day | 15 days | 24 days |
| 0 | 0.17 | 0.16 | 0.15 | 0.23 |
| 2 | 0.18 | 0.16 | 0.16 | 0.24 |
| 5 | 0.22 | 0.22 | 0.19 | 0.28 |
| 20 | 0.40 | 0.37 | 0.38 | 0.44 |
| 50 | 0.57 | 0.52 | 0.55 | 0.60 |
| 100 | 0.63 | 0.60 | 0.62 | 0.72 |

Additional samples of the color-change dosimeter film of Example 1-B were prepared except using the organosol formulated at 56% by weight "Geon" 178 dispersion grade PVC solids and 75% by weight total solids. These samples were irradiated with two high intensity UV lamps (0.78 J/cm$^2$ total output) at 60 ft./min. (18.3 m/min.) for 1, 5, and 10 passes. Absorbance values were recorded with a UV-visible spectrophotometer and monitored both immediately after UV irradiation and then after storage in the dark. Results are in Table XI.

TABLE XI

| UV No. of Passes | Absorbance at 615 nm after storage in dark | | | |
|---|---|---|---|---|
| | 0 days | 8 days | 16 days | 79 days |
| 0 | 0.27 | 0.28 | 0.27 | 0.27 |
| 1 | 0.50 | 0.47 | 0.46 | 0.40 |
| 5 | 0.80 | 0.79 | 0.75 | 0.71 |
| 10 | 0.92 | 0.86 | 0.84 | 0.80 |

EXAMPLE 1-C

To 30 g of the organosol formulated at 56% by weight "Geon" 178 dispersion grade PVC solids and 75% by weight total solids was added 0.84 g of "Nuostabe" 1923 Ca/Zn heat stabilizer from Tenneco Chemicals, USA (currently sold as "Mark V-1923" by Witco Corporation), followed by a 50% solution of Leuco Dye A in toluene in an amount providing 10 parts per 100 parts of the PVC. This was coated (0.075 mm thickness) onto a preformed sheet of plasticized PVC, dried, and heated for 30 seconds at 177° C. followed by 30 seconds at 204° C. to give a film 0.035 mm in thickness. Samples of the resulting dosimeter film (that had not been protectively overcoated) were E-beam irradiated using an Energy Sciences Inc. CB-150 Electron Beam Processor at 175 KeV, a set current of 0.30 mA, and 60 ppm oxygen. The speed of the web line to which the samples were attached was incrementally increased to decrease the absorbed dose. The absorbance values were recorded immediately and reported in Table XII.

TABLE XII

| Web Speed (ft/min.) | (m/min.) | E-beam Dose (Mrads, kGys/10) | Absorbance at 615 nm immediately after E-beam |
|---|---|---|---|
| | | 0 | 0.25 |
| 20 | 6.1 | 1 | 0.60 |
| 40 | 12.2 | 0.52 | 0.41 |
| 60 | 18.3 | 0.35 | 0.35 |
| 80 | 24.4 | 0.26 | 0.33 |
| 100 | 30.5 | 0.21 | 0.32 |
| 120 | 36.6 | 0.18 | 0.28 |

EXAMPLE 2-A

A color-change dosimeter film was made as in Example 2 except that the polyurethane protective overcoating was omitted. Samples were irradiated with an Questek Model 2440 ultraviolet excimer laser at 193 nm, becoming light red-fuchsia after one pulse at 9 mJ/cm$^2$ and bright red-fuchsia after 50 pulses.

FURTHER TESTING OF EXAMPLES 2 AND 3

Each of the color-change dosimeters of Examples 2 and 3 was gamma irradiated with a Atomic Energy of Canada Ltd. JS-3500 cobalt-6 gamma sterilizer, and spectrophotometer readings were made using the IBM Instruments 9430 spectrophotometer at the same time as the readings recorded in Table VIII and after storage in the dark, except the measurements were made at 540 nm (Table XIII) and at 600 nm (Table XIV).

TABLE XIII

| Gamma Dosage (Mrads, kGys/10) | Absorbance at 540 nm after storage in dark after receipt of samples | | |
|---|---|---|---|
| | 2 days | 4 days | 27 days |
| 0 | 0.28 | 0.26 | 0.25 |
| 1 | 0.30 | 0.28 | 0.27 |
| 2 | 0.50 | 0.48 | 0.41 |
| 3 | 0.70 | 0.70 | 0.58 |
| 5 | 1.66 | 1.59 | 1.47 |
| 8 | 2.54 | 2.56 | 2.44 |
| 10 | 5.76 | 5.75 | 5.59 |

TABLE XIV

| Gamma Dosage (Mrads, kGys/10) | Absorbance at 600 nm after storage in dark after receipt of samples | | |
|---|---|---|---|
| | 2 days | 4 days | 27 days |
| 0 | 0.24 | 0.25 | 0.23 |
| 1 | 0.28 | 0.27 | 0.28 |
| 2 | 0.45 | 0.42 | 0.39 |
| 3 | 0.53 | 0.49 | 0.47 |
| 5 | 0.89 | 0.83 | 0.80 |
| 8 | 1.47 | 1.42 | 1.39 |
| 10 | 1.78 | 1.79 | 1.74 |

When a color-change dosimeter film of the invention contains a single acid-sensitive leuco dye as in each of the examples, its color tends to progressively increase in intensity at increasing irradiation, and this change in intensity can be calibrated to afford reliable indications of the amount of radiation it receives. When a novel color-change dosimeter film contains more than one acid-sensitive leuco dye, the different colors to which it changes could be used to indicate radiation dosages, but this would make calibration somewhat more complicated.

EXAMPLE 8

To 30 g of a higher viscosity organosol of Example 1 at 56% by weight "Geon 178" dispersion grade PVC solids and 75% by weight total solids was added 0.84 g of "Nuostabe" 1923 Ca/Zn stabilizer (now known as "Mark V-1923" Ca/Zn stabilizer), followed by a 50% solution of Leuco Dye A in toluene to give 5 parts of Leuco Dye A per 100 parts of the PVC. This was knife-coated (0.076 mm thickness) onto a preformed sheet of PET as in Example 1-A, dried in air, and heated 30 seconds at 177° C., followed by 30 seconds at 204° C. to provide a film 0.018 mm in thickness. Six samples of the color-change dosimeter film on PET film, (which unlike the samples of Example 1-A, had not been protectively overcoated), were gamma irradiated using the AECL JS-7500 gamma sterilizer at various dosages, and the absorbance values immediately recorded using a Milton Roy Model 301 spectrophotometer. Results (averages of the six samples) are recorded in Table XV.

TABLE XV

| Gamma Dosage (Mrads, kGys/10) | Absorbance at 615 nm immediately after gamma radiation |
| --- | --- |
| 0 | 0.13 |
| 0.07 | 0.14 |
| 0.52 | 0.34 |
| 1.96 | 0.98 |
| 3.08 | 1.54 |

From these data, a correlation curve for gamma irradiation dosages lower than about 3 Mrad can be calculated for subsequent use. At the lower end of such calibration curve are dosages approved for irradiation of food. At the upper end of such calibration curve are dosages commonly used for sterilization of medical products. The versatility of the dosimeter film permits usage as a quantitative dosimeter to measure the extent of the exposure of food or medical products to high energy radiation or usage as a qualitative indicator of the exposure of the food or medical products to a predetermined amount of high energy radiation.

EXAMPLE 9

To 50 g of the organosol of Example 1 was added 2.5 g of "Nuostabe" 1923 Ca/Zn stabilizer, (now known as "Mark V-1923" stabilizer,) followed by 5 g of a 50% solution of Leuco Dye A in toluene. This dispersion was silk screened onto a 0.10 mm thick PET film, air dried, heated at 66° C. for 1 minute, and heated at 204° C. for 1 minute to give a substantially colorless printed "eye chart" and a 10×27.5 cm printed film 0.010 mm in thickness.

Samples of the printed color-change dosimeter film, (which unlike the samples of Example 1, had not been protectively overcoated) were E-beam irradiated using the Energy Sciences CB-150 Electron Beam Processor at the same and additional dosages as that for Example 1 using the same E-beam voltage and rate as Example 1 except at 60 ppm oxygen concentration.

The transmission optical density was immediately recorded using a Macbeth Model TD504 optical densitometer fitted with a red filter. Results (averages of the three readings) are given in Table XVI.

TABLE XVI

| E-Beam Dosage (Mrads, kGys/10) | Transmission optical density (red filter) immediately after E-beam irradiation |
| --- | --- |
| 0 | 0.03 |
| 1 | 0.06 |
| 2 | 0.10 |
| 2.5 | 0.12 |
| 3 | 0.13 |
| 5 | 0.21 |
| 8 | 0.26 |
| 10 | 0.33 |

A calibration curve can be developed from these data to assist assessing industrial processing such as cross-linking of polymers.

EXAMPLE 10

The organosol dispersion of Example 1-C, which contained 3 parts of "BH-185" Ba/Zn heat stabilizer from Ferro Corporation on 100 parts PVC, was used to silk screen print several bar codes using a 230 mesh screen white preformed sheets of plasticized PVC 0.05 mm in thickness and on 0.10 mm thick PET sheets. The samples were dried and heated as in Example 9. When exposed to 3 Mrads or 30 kGys of E-beam radiation using the same equipment under the same voltage, rate, and oxygen concentration as for Example 9, the bar codes appeared medium blue in color.

This example demonstrates the ability to use a qualitative pass/fail detection system with the dosimeter film of the present invention.

EXAMPLE 11

To 500 g of the organosol of Example 1 was added 17.5 g of a Ba/Zn stabilizer ("BH-185" from Ferro), followed by a 65% solution of Leuco Dye A in toluene in an amount providing 10 parts of Leuco Dye A per 100 parts of PVC. This was knife-coated 0.075 mm wet thickness onto a 30.5 cm wide PET web (0.075 mm thick "Melinex" 605 from ICI Americas) moving at a rate of 1.5 m per minute using a pilot plant scale coater. The coating was heated while passing through three ovens set at 82° C., 204° C., and 204° C., respectively, to give approximately 21.3 m of substantially colorless color-change dosimeter film with an average cross-web thickness of 0.036 mm. The total residence time in all three ovens was about 6 minutes.

A 30.5 cm square specimen of the color-change dosimeter film was protectively covered with clear urethane as in Example 1, except the cure was catalyzed with a small amount of dibutyltindilaurate. Samples of this film were E-beam irradiated as in Example 1, except at 40 ppm oxygen concentration, and immediately tested for absorbance values using the IBM Instruments 9430 UV-visible spectrophotometer. Results are given in Table XVII.

TABLE XVII

| E-beam Dosage (Mrads, kGys/10) | Absorbance at 615 nm immediately after E-beam irradiation |
| --- | --- |
| 0 | 0.08 |
| 1 | 0.19 |
| 3 | 0.34 |
| 5 | 0.62 |
| 8 | 0.94 |
| 10 | 1.10 |

A calibration curve can be developed from these data to assist assessing industrial processing such as cross-linking of polymers.

EXAMPLE 12-A

The organosol formulation of Example 11 was silk screen printed using a 157 mesh screen onto a white preformed sheet of PET film, 0.075 mm in thickness ("Melinex" 475 from ICI Americas, currently sold as "Melinex" 339), air dried, and heated as in Example 1 to give a substantially colorless repeating message of "3M Sterile." When the film was exposed to 2.5 Mrad or 25 kGy E-beam dosage using the Energy Sciences CB-150 Electron Beam Processor as in Example 1 the message appeared medium blue in color. When gamma irradiated using the AECL JS-750 gamma sterilizer at the same dosage, the message appeared dark blue.

EXAMPLE 12-B

A silk screen printed "radura" symbol (the international symbol for irradiated food products (c.f., 21 C.F.R. Section 179.30)) was made as in Example 12-A except Leuco Dye E was used in place of Leuco Dye A and a 0.075 mm thick transparent PET film was used in place of the "Melinex" 475. When the film was exposed to 3 Mrad or 30 kGy E-beam radiation using the Energy Sciences CB-150 Electron Beam Processor, the "radura" symbol appeared medium green in color.

EXAMPLE 13

To 20 g of a 30% by wt solution of "Fluorel" FC2230 fluoroelastomer (copolymer of vinylidene fluoride and hexafluoropropylene monomers in a mole ratio of 78:22, respectively, made by 3M Company of St. Paul, Minn.) in methylisobutyl ketone was added 0.42 g of BH-185, followed by 1.2 g of a 50% solution of Leuco Dye A in toluene. This was knife-coated 0.076 mm wet thickness onto a 15.2 cm-wide PET film 0.051 mm in thickness and dried in air. The dosimeter film was translucent white in appearance. Samples of the fluorine-containing color-change dosimeter film (that had not been protectively overcoated) were electron beam irradiated using the Energy Sciences CB-150 Electron Beam Processor at various dosages and the reflection optical density was immediately recorded using a Macbeth Model TR927 optical densitometer fitted with a red filter. Results are given in Table XVII.

TABLE XVII

| E-Beam Dosage (Mrads kGys/10) | Reflection Optical Density (Red Filter) Immediately after E-beam Irradiation |
|---|---|
| 0 | 0.18 |
| 1 | 0.21 |
| 2 | 0.20 |
| 3 | 0.23 |
| 5 | 0.21 |
| 10 | 0.27 |
| 20 | 0.44 |
| 30 | 0.91 |
| 50 | 1.16 |
| 100 | 1.04 |

EXAMPLE 14

A brominated polyester epoxy resin was prepared as follows: to 4.07 moles of propylene glycol in a reactor was added 2.1 moles of adipic acid. Stirring commenced until uniformity was reached. Successively, 2.1 moles of adipic acid, 0.39 moles of trimethyolpropane and 1.07 moles of tetrabromophthalic anhydride was added to the reactor. A trace amount of anhydrous sodium acetate was added to scavenge any trace impurities of sulfuric acid and/or sulfonic acid. Then 0.27 moles of toluene was added to the reactor. The reactor was heated to 160° C., driving off water according to the Dean-Stark fashion. The amount of water driven off was collected, weighed and analyzed for weight percent propylene content using refractive index determinations. The equivalent weight of propylene glycol lost was re-introduced, and the reactor remained heated at 160° C. for one hour. Then, a partial vacuum of 40 mmHg was initiated to remove solvent and any remaining water and continued for two hours or until the acid number of the resin had a value of between 48 and 58. Then, the reaction was cooled to 107° C. and 4.1 moles of additional toluene and 1.1 moles of "Epon" 828 resin from Shell Chemical Co. were successively added. The reaction continued until the viscosity reached at least 5000 cps (as measured at room temperature). Then the reactor was cooled to 52° C. and more toluene was added in an amount needed to yield a resin viscosity of 1500-2000 cps and comprising 73-77% resin solids. The resulting resin was cooled, filtered and stored.

To 10 g of a brominated polyester epoxy resin (75.7% solids of the brominated polyester epoxy resin prepared according to the preceding paragraph in toluene at 16.4% bromine content) was added 1.51 g of a 50% solution of Leuco Dye A in toluene. This was coated and dried as in Example 13 to give a dosimeter film 0.034 mm in thickness. The dosimeter film was light blue in appearance. Samples of the bromine-containing color-change dosimeter film (that had not been protectively overcoated) were electron beam irradiated using the Energy Sciences CB-150 Electron Beam Processor at various dosages and the absorption values immediately recorded with the IBM Instruments 9430 UV-visible spectrophototer. Results are given in Table XVIII.

TABLE XVIII

| E-Beam Dosage (Mrads kGys/10) | Absorbance at 615 nm Immediately After E-Beam Irradiation |
|---|---|
| 0 | 0.13 |
| 0.35 | 0.33 |
| 0.52 | 0.27 |
| 1 | 0.53 |
| 2 | 0.66 |
| 5 | 1.55 |
| 10 | 2.60 |

EXAMPLE 15

To 70.0 g of "Admex" 770 medium molecular weight polyester plasticizer from Nuodex, Inc., 200.0 g of "Geon" 178 dispersion grade PVC from B.F. Goodrich Co., and 130.0 g of ethyl 3-ethoxypropionate from Eastman Chemical Products, Inc. was added 750 g of glass beads in a quart jar. The jar was sealed and rolled on a roller for six days after which time, the mixture was filtered through a cloth filter to give an organosol.

To 50 g of the above-described organosol was added 2.5 g of "BH-185" Ba/Zn stabilizer from Ferro Corp. followed by 5 g of a 50% solution of Leuco Dye A in toluene. The dispersion was silk screen printed using a 230 mesh screen onto 0.075 mm-thick "Melinex" 339 PET film, air dried, and heated at 204° C. for 1 minute to give an indicator tape having a substantially colorless printed repeating pattern message of short diagonal lines and the letter "S" over an area approximately 11.4×29.2 cm. Four pieces of the indicator tape were coated with a urethane clear coat formulated as follows: 10.0 g of "K-Flex" 188 polyol, 10.0 g of n-butyl acetate, and 7.6 g of "Desmodur" N-3200 isocyanate were combined by stirring in a 120 ml jar followed by the addition of 4 drops of a 50% by volume solution of dibutyltindilaurate in n-butyl acetate. The clear coat was knife-coated 0.025 mm wet thickness on the indicator tape and cured 2 minutes in an air-circulating oven at 150° C. to a tack-free state.

To make an adhesive-backed indicator tape, an adhesive commercially available from the Industrial Specialties Division of 3M Company as #950 5 mil Adhesive Transfer Tape was coated on a paper release liner at approximately 6 mg/sq cm. The adhesive and liner were then laminated to the back of the PET of the indicator tape. Samples of the adhesive-backed indicator tape were exposed to electron beam radiation using the Energy Sciences CB-150 Electron Beam Processor as in Example 1 except the oxygen level was 40 ppm. When exposed to 2.5 Mrad electron beam dosage, the colorless printed repeating pattern message changed color to a medium blue and at 4.5 Mrad, medium-dark blue.

The invention has been described in various embodiments and using examples but it is not so limited.

What is claimed is:

1. A color-change dosimeter film, comprising: substantially colorless acid-sensitive leuco dye dispersed in an organosol film of halogen-containing polymer particles fused in a plasticizer containing said dye at a minimum sufficient temperature of fusion and a minimum sufficient time of fusion to form the film but keep the film as free from color as possible;

said dye (a) being substantially free from groups that are sensitive to high-energy radiation, (b) becoming colored in acid released from said polymer upon exposure of the film to high-energy radiation, and (c) retaining color substantially unchanged in the film after the exposure of the film to high-energy radiation is completed;

wherein said leuco dye comprises carbazolyl methane, bisindophthalide, fluoran, or mixtures thereof; and wherein the film has a protective clear coat on at least one surface of the film.

2. The color-change dosimeter film of claim 1 wherein said leuco dye is present in an amount of from 1 to 10 parts per 100 parts by weight of said polymer.

3. The color-change dosimeter film of claim 1, wherein said halogen-containing polymer comprises a chlorine-containing polymer, a bromine-containing polymer, a fluorine-containing polymer, or combinations thereof.

4. The color-change dosimeter film of claim 1 which has been exposed by high-energy radiation to create a colored message.

5. The color-change dosimeter of claim 1, wherein said film has a thickness of from about 0.01 mm to about 0.1 mm.

6. An article to determine an extent of high-energy radiation exposure, comprising: at least one color-change dosimeter film of claim 1 and a substrate on which each film is coated.

7. The high-energy radiation determination article according to claim 6, wherein said film collectively comprise a substantially colorless message of said dosimeter on said substrate, which message becomes colored when said indicator is exposed to high-energy radiation of at least 0.1 kiloGrays.

8. The high-energy radiation determination article according to claim 6, wherein said indicator further comprises an adhesive layer adhered to said substrate.

9. The high-energy radiation determination article according to claim 6, wherein said adhesive is an acrylate based pressure sensitive adhesive.

10. The high-energy radiation determination article according to claim 6, wherein said substrate comprises a material which does not contain such amounts of acid therein which can react with said dye.

11. The high-energy radiation determination article according to claim 4, wherein said substrate comprises a radiation and heat resistant polymer film.

12. The high-energy radiation determination article according to claim 6, further comprising a nearly transparent protective coating over each said film.

13. A method for preparing a high-energy radiation dosimeter film of claim 1, comprising:
   (a) dispersing substantially colorless acid-sensitive leuco dye into an organosol containing a plasticizer and particles of a halogen-containing polymer to form a dispersion;
   (b) coating at least a portion of a surface of a substrate with the dispersion of step (a);
   (c) heating said dispersion to a minimum sufficient temperature and minimum sufficient time (1) to fuse particles of said polymer and form at least one substantially colorless, color-change dosimeter film of claim 1 on said substrate; and (2) to keep the film as free from color as possible; and
   (d) coating at least one surface of the film with a protective clear coat.

14. A method for preparing a high-energy radiation dosimeter film, according to claim 13, wherein said coating step comprises printing said dispersion onto said surface of said substrate.

* * * * *